Nov. 18, 1969   R. B. GORANSON ET AL   3,478,695
PULSATILE HEART PUMP

Filed Feb. 13, 1968   3 Sheets-Sheet 1

INVENTORS
RICHARD B. GORANSON
WILLIAM R. MARTINI
BY
-AGENT-

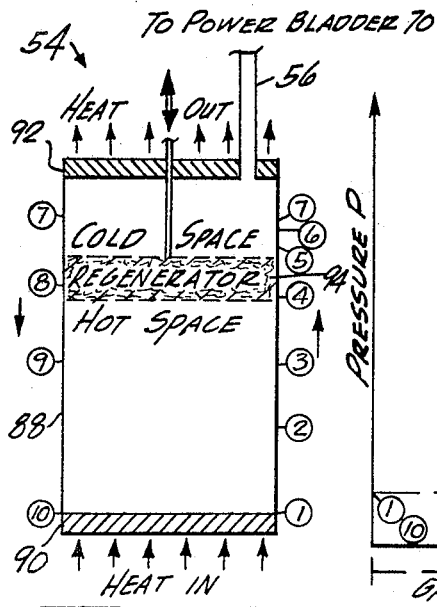
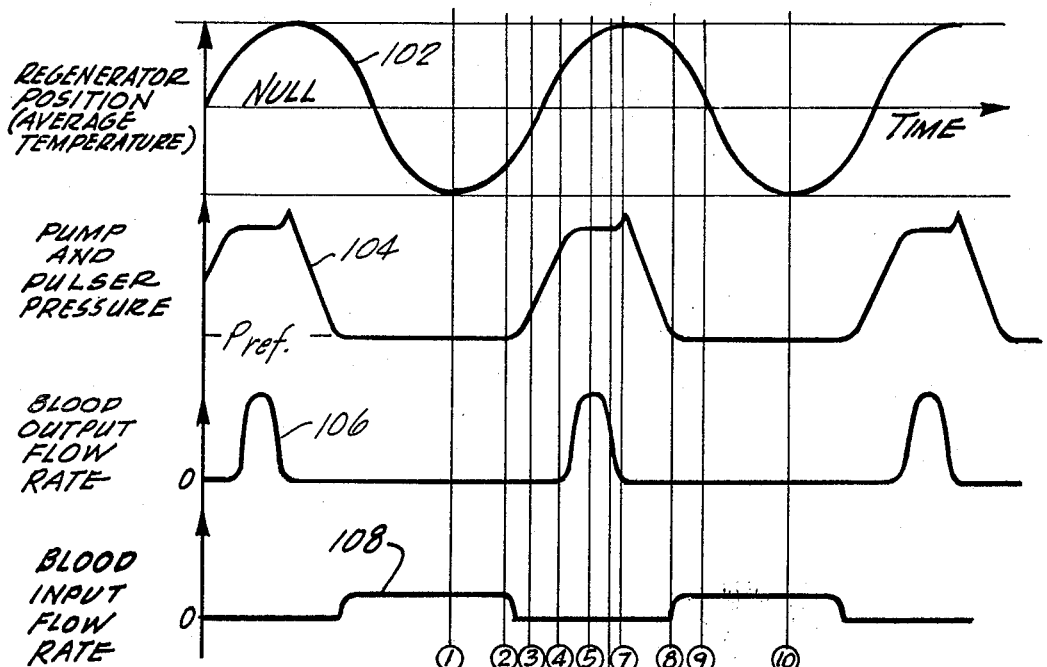

INVENTORS
RICHARD B. GORANSON
WILLIAM R. MARTINI
BY
—AGENT—

United States Patent Office
3,478,695
Patented Nov. 18, 1969

3,478,695
PULSATILE HEART PUMP
Richard B. Goranson, Kennewick, and William R. Martini, Richland, Wash., assignors to McDonnell Douglas Corporation, a corporation of Maryland
Filed Feb. 13, 1968, Ser. No. 705,121
Int. Cl. F04b 43/12, 17/00; F15b 7/00
U.S. Cl. 103—152                9 Claims

ABSTRACT OF THE DISCLOSURE

Pulsatile, passive filling (controlled suction), pump device is used in a pair as assist device or total replacement for an animal's heart. Each pump device includes a rigid container which houses a power bladder positioned closely beside a resilient vessel. Blood inlet and outlet check valves are suitably located in each vessel. Void space in container is filled at all times with air from a surge bladder which is maintained at atmospheric pressure. A source of periodic pressures pulses regularly distends power bladder which compressively discharges the blood-filled vessel. Other versions of the pump device are also disclosed.

CROSS-REFERENCES TO RELATED APPLICATIONS

A Stirling cycle thermal amplifying machine having an independently oscillated regenerator for producing large pressure pulses is shown, described and claimed in a copending patent application of William R. Martini, Ser. No. 702,745, filed Feb. 2, 1968 for Stirling Cycle Amplifying Machine. A Stirling cycle thermal machine having a self oscillating regenerator for producing large pressure pulses is shown, and described and claimed in a copending patent application of Arthur R. Baumgardner, Richard P. Johnston, William R. Martini and Maurice A. White, Ser. No. 702,420, filed Feb. 1, 1968 for Stirling Cycle Machine With Self Oscillating Regenerator.

BACKGROUND OF THE INVENTION

Our invention relates generally to the field of pumps and more particularly to a pulsatile, passive filling (controlled suction), pump device which is useful for the pumping of blood in the circulatory system of animal.

In the development of an implantable artificial heart unit, used, either as an assist device or total replacement for the heart in an animal, it has been found that control of the heart unit can be minimized if the pumps thereof are each a pulsatile, passive filling (controlled suction), pump device. The passive filling or controlled suction pump device has successfully duplicated cardiac function in extracorporeal experiments with no controls or adjustments required for it.

It is apparent that the passive filling or controlled suction pump device must be as reliable as possible with little or not portion thereof requiring maintenance or being subject to significant wear. Thus, it is highly desirable that the lubrication and bearing problems inherent in conventional pump devices be eliminated or avoided in the passive filling or controlled suction pump device. Implicit in the attainment of high reliability is the requirement that the pump device be simple in structure, although such structure could be quite novel. The lack of bearings or any moving metal parts, for example, in such a pump device will provide extremely reliable operation over extended periods of time.

Our invention includes features which render it particularly useful for pumping blood in an animal. These features are:

(1) Gentleness in handling the blood. This is of prime importance in the pumping of blood through the circulatory system of an animal, for example.
(2) Controlled suction. A certain amount of suction may be necessary to fill the pump device with sufficient rapidity but suction which reaches back into the veins and collapses them would create a severe problem.
(3) Limited output pressure. Most positive displacement type pumps must have separate protection against over-pressure, especially in the pumping of blood. Because of the tye of power source used in this invention, such protection is inherent therein.

SUMMARY OF THE INVENTION

Briefly, and in general terms, our invention is preferably accomplished by providing a novel pump device which is not complex in any manner, does not require lubrication of any part thereof and avoids the use of any kind of bearings throughout the device. In one version of the invention, the pump device generally includes an elongate power bladder, a tubular and resilient vessel positioned adjacently in proximity or contiguous to the power bladder, a hermetically sealed rigid container which closely houses the power bladder and its adjacent vessel, and an exterior surge bladder maintained at atmospheric pressure and connected to the container to fill the void space therein with air at all times during the pumping cycle of the device. An inlet check valve is located at one end of the vessel and an outlet check valve is located at the other end. It is noted that the surge bladder is an important element of the pump device and is necessary for an implantable design. In a non-implantable design, the disclosed pump device can operate without the surge bladder by having the rigid container open directly to the atmosphere or through inlet and outlet valves spring-loaded to operate at suitably predetermined pressures.

Blood taken from an appropriate point in the circulatory system, for example, of an animal can be applied to the inlet check valve. The blood passes into the vessel and is subsequently discharged by the power bladder through the outlet check valve back into the circulatory system at another point thereof. The power bladder is connected to a source of periodic pressure pulses which cyclically distend the power bladder in the rigid container to displace air therefrom to the connecting surge bladder. When the rigid container is essentially filled by the expanding power bladder, further expansion thereof will be against the blood-filled resilient vessel initiating a pumping pulse therein. When the expanding power bladder begins to compress the vessel, the inlet check valve closes and the outlet check valve opens when the pressure in the vessel is sufficiently high, and blood is pumped from the vessel back into the circulatory system of the animal.

As a pressure pulse drops from its peak pressure, the power bladder gradually contracts but air from the distended surge bladder now moves into the container to prevent the vessel from quickly resuming its normally round shape and sucking blood. The vessel will, however, fill with blood due to the normal, existing venous or arterial pressure and gradually distend the vessel against the air supplied by the surge bladder. The resiliency of the vessel is also such that it is not unduly strong elastically. When the vessel is refilled, it is ready for the next pressure pulse and another cycle of operation. Using this principle, our pump device operates in a controlled suction manner which is substantially identical to a normal, healthy animal's heart.

The resilient vessel in the described pump device cannot suck blood by itself since it normally does not have nearly enough resiliency. It can, however, suck blood where the contracting power bladder produces sufficient vacuum in the rigid container. Since it is desirable that the pump device operate essentially on a non-sucking basis, so that there is no danger of causing collapse of any of the veins, the surge bladder is used to maintain the pressure inside of the rigid container substantially constant.

A flaccid (limp) or non-flaccid surge bladder can be used as may be required. The flaccid surge bladder will keep the pressure within the rigid container at substantially atmospheric pressure even when the pump device is immersed in body fluids. The non-flaccid surge bladder is, of course, operative (expanded further) at pressures exceeding that necessary to stretch the surge bladder.

BRIEF DESCRIPTION OF THE DRAWINGS

Our invention will be more fully understood, and other features and advantages thereof will become apparent, from the description given below of certain exemplary embodiments of the invention. This description of the exemplary embodiments is to be taken in conjunction with the accompanying drawings, in which:

FIGURE 3 is a fragmentary, diagrammatic sectional representation of a regenerative thermal machine which can be used to provide pressure pulses to operate the pump device shown in FIGURE 2;

FIGURE 4 is a graph showing related pressure versus volume plots of blood in the pump device of FIGURE 2 and gas in the regenerative thermal machine of FIGURE 3 when the machine is connected to drive the pump device;

FIGURE 5 is a graph showing curves which illustrate the operation of the pump device of FIGURE 2 and the regenerative thermal machine of FIGURE 3 when the machine is connected to drive the pump device;

DESCRIPTION OF THE PRESENT EMBODIMENTS

Figure 1:
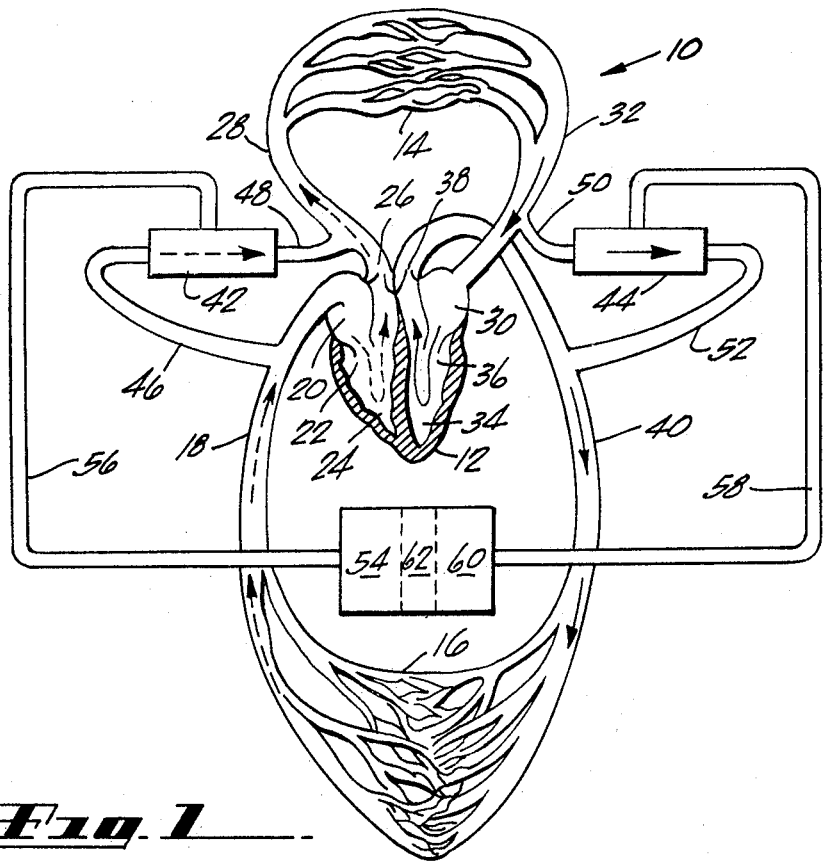
FIGURE 1 is a diagrammatic and generally schematic drawing of the circulatory system of an animal wherein a pair of pump devices according to our invention is connected as an assist device for the animal's heart.

FIGURE 1 diagrammatically and schematically shows the circulatory system 10 of an animal wherein its heart 12 pumps blood through the lung capillaries 14 and through the systemic capillaries 16. As is well-known, and broadly, the (superior and inferior) vena cava 18 carries venous blood from all parts of the body to the right (with respect to the heart itself) atrium 20 of the heart 12. The blood passes through the tricuspid valve 22 into the right ventricle 24 which forces it through the pulmonary valve 26 and to the lung capillaries 14 through the pulmonary artery 28. The blood loses waste and takes up oxygen in the lung capillaries 14, and is then returned to the left atrium 30 through the pulmonary vein 32. The blood enters the left ventricle 34 from the left atrium 30 through the mitral valve 36. The left ventricle 34 then forces the blood through aortic valve 38 into the aorta 40 which delivers the blood to the systemic capillaries 14 and all parts of the body of the animal.

The muscular walls of the left ventricle 34 are much thicker than those of the right ventricle 24 because more energy is required of the left ventricle 34 to pump blood through the higher resistance of the systemic capillaries 16 than through that of the lung capillaries 14. The heart 12 becomes filled with venous blood during its relaxation, or diastole, period and forces blood into the arteries during its contraction, or systole, period. The strength of contraction of the heart is highly dependent upon the condition of the cardiac muscle thereof, and any impairment of its function results in a dilation of the heart. In a weakened heart, it must dilate or enlarge so that a larger diastolic volume is obtained in the heart to produce, by its inherent nature, stronger contractions during its systole periods. The weak heart contractions are thus increased to their normal and proper strength to do its original or usual work. A dilated or enlarged heart, over normal, as may be determined by X-ray photographs, is an early sign of an impaired heart. Continued deterioration of the condition of the heart could well lead to a complete loss of contractility.

The impaired heart 12 in FIGURE 1 is assisted in carrying its load by the pump devices 42 and 44 which are connected in parallel with respective sides of the heart 12. As can be seen, the pump device 42 is connected from the (common junction of the superior and inferior) vena cava 18 by tubing 46 and to the pulmonary artery 28 by tubing 48. Similarly, the pump device 44 is connected from the pulmonary vein 32 by tubing 50 and to the aorta 40 by tubing 52. The pump device 42 is operated by periodic pressure pulses from, for example, a constant volume regenerative, or Stirling, cycle thermal machine 54. These pressure pulses are provided through a connecting tubing 56 to drive the pump device 42. In like manner, the pump device 44 is operated by periodic pressure pulses provided through a connecting tubing 58 from a regenerative thermal machine 60 similar to the machine 54. Input heat energy for the machines 54 and 60 is provided by a common heat source 62 which can be, for example, an isotope-fueled (such as $Pu^{238}$) source of long life. The machines 54 and 60 can be each similar to any of those disclosed in the copending patent applications of William R. Martini for Stirling Cycle Amplifier Machine or Arthur R. Baumgardner, Richard P. Johnston, William R. Martini and Maurice A. White for Stirling Cycle Machine With Self Oscillating Regenerator, which are fully referenced above.

Figure 2:
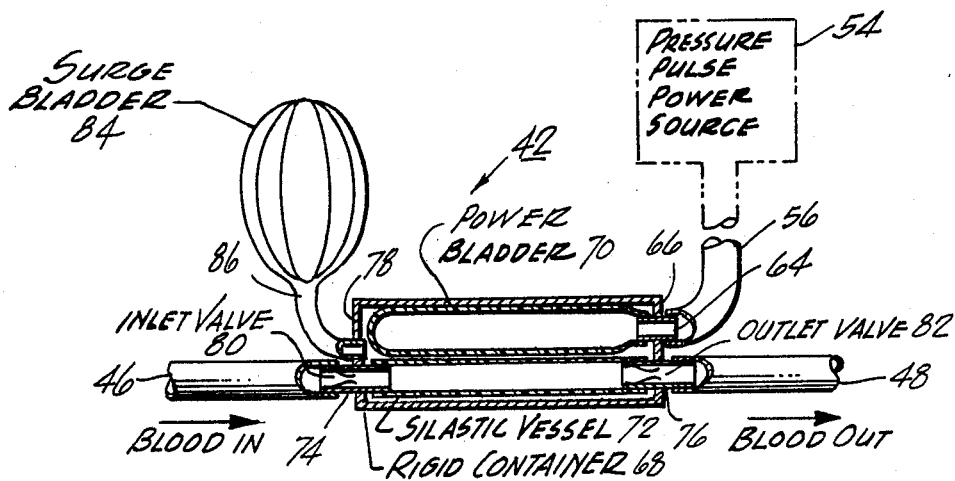
FIGURE 2 is a side elevational view, shown partially in section, of an illustrative embodiment of a pump device according to this invention.

FIGURE 2 is a side elevational view, shown partially in section, of an illustrative embodiment of the pump device 42. The pump device 44 is, of course, preferably similar in structure to that shown for the pump device 42. The regenerative thermal machine 54, which is the source of the periodic pressure pulses for operating the pump device 42, is indicated in phantom lines. Tubing 56 connects the output of the machine 54 to the exterior end of a short tubing 64 which extends into the end wall 66 of a fully sealed and rigid container 68. The short tubing 64 is affixed and sealed to the wall 66 at about the middle of its length. The exterior end of the short tubing 64 is bonded or otherwise secured to the end of the tubing 56, and its interior end is bonded or otherwise secured to the mouth of the power bladder 70.

In an experimental demonstration model, the container 68 was generally cylindrical in shape (about 6 inches long and 1 inch in diameter) and was fabricated of transparent Plexiglas to permit viewing of the interior elements in operation. As illustrated in FIGURE 2, the power bladder 70 is an elongate element which is substantially flat when there is no air or gas in it. It is, of course, about the same width of the container 68 and must be made of a very durable and flexible material such as Silastic, which is an elastic silicone polymer material. A tubular and resilient vessel 72 of about the same length as the power bladder 70 is closely positioned, in parallel, adjacent therewith. The two elements 70 and 72 are, of course, normally contiguous at all times. The vessel 72 is preferably round in its relaxed state and also fabricated of a silicone polymer, such as Silastic, which has high resiliency and is resistant to attack from most chemicals, radiation and other agents.

One end of the vessel 72 is bonded or otherwise secured to the interior end of a short tubing 74, and the other end of the vessel 72 is bonded or otherwise secured to the interior end of another short tubing 76. The short tubing 74 is affixed and sealed at about the middle of its length to end wall 78 of the rigid container 68. Similarly, the short tubing 76 is affixed and sealed at about the middle of its length to end wall 66, just below the short tubing 64. The short tubings 74 and 76 are both substantially identical, and mount respective clapper valves 80 and 82 therein. There are, of course, many other types of successful and commercially available (blood) valves for prosthetic purposes and which could be used in place of the clapper-type valves. The exterior end of the short tubing 74 is bonded or otherwise secured to the end of tubing 46, and the exterior end of the short tubing 76 is bonded or otherwise secured to the end of the tubing 48. Thus, the clapper valve 80 is the inlet check valve permitting blood to enter the vessel 72, and the clapper valve 82 is the outlet check valve which permits blood in the vessel 72 to be discharged by the action of power bladder 70 out of the vessel 72. Finally, a surge bladder 48 which is maintained at atmospheric pressure has the end of its connecting tubing 86, protruding into the rigid container 68 through its end wall 78, bonded and sealed thereto. The surge bladder 84 is, illustratively, fabricated from Silastic, for example. While air has been used in the surge bladder 84 and within the rigid container 68, other fluids (gases or liquids) can be used as may be desired or required.

In operation, as generally described before, the pressure pulses from the machine 54 periodically distend the power bladder 70 which, in turn, compresses the vessel 72 and discharges the blood contained therein out the outlet check valve 82. When the power bladder 70 expands, it forces air from the void spaces in the container 68 out into the surge bladder 84, distending the same. As a pressure pulse drops from its peak pressure, the power bladder 70 gradually contracts but air from the distended surge bladder 84 now returns into the container 68 and prevents the vessel 72 from quickly resuming its normally round shape and sucking blood through the inlet check valve 80. The vessel 72, however, gradually fills with blood through the inlet check valve 80 due to the normal, existing venous pressure in the tubing 46 and soon distends the vessel 72 back to its normal shape against the air returned to the container 68 by the surge bladder 84.

The pump device 42 can still operate should the surge bladder 84 become inoperative or is not used in the device 42. However, there is the danger that without the surge bladder 84 then produced by the power bladder 70 could cause the vessel 72 to suck blood and may result in the collapse of the veins leading to the heart. The resilient vessel 72 should be pliable but need not be resilient since the normal, existing venous (or arterial) pressure will suitably fill the vessel 72 with blood even though it is not resilient.

FIGURE 3 is a fragmentary, diagrammatic sectional representation of the regenerative thermal (Stirling cycle) machine 54. The machine 54 includes an outer container 88 carrying a working fluid (air, xenon or helium, for example) therein and having a hot wall 90 and a cold wall 92, and an inner regenerator 94 which is moved on its rod in a suitable working stroke length between the relatively hot and cold surfaces of the walls 90 and 92. The regenerator 94 may be independently oscillated up and down or may be self oscillated as taught in the related applications which are fully cross-reference above. The hot wall 90 is heated by the heat source 62 (FIGURE 1), and the cold wall 92 can be cooled by a liquid (which can be, for example, a portion of the blood of the animal) circulated against or through suitable passageways in the wall 92. Output pressure pulses are coupled from the working chamber of the container 88 directly to power bladder 70 by the tubing 56, as the lower surface of the regenerator 94 is cyclically oscillated up and down following the circled numerals indicated along the two sides of the container 88. The working fluid in the tubing 56 generally follows the relationship $(PV/T_{ave.}) = $ constant, where P is pressure, V is volume and $T_{ave.}$ is the average temperature of the working fluid. The use of this type of machine 54 as the power source for the pump device 42 obviates the need for separate protection against overpressure from the device 42.

FIGURE 4 is a graph showing simultaneous pressure versus volume plots 98 and 100 respectively of the working fluid or gas of the machine 54 (FIGURE 3), and the working fluid or blood of the pump device 42 (FIGURE 2). The plots 98 and 100 shown in the graph have been generaly idealized and are, of course, only approximately representative of the operation of the actually combined machine 54 (pulser) and the pump device 42 (pump). The plot 98 for the gas is shown in broken lines, and the plot 100 for the blood is shown in full lines. The circled numerals positioned beside the two plots 98 and 100 correspond to similar circled numerals shown in FIGURE 3 indicating the position of the regenerator 94 of the machine 54. As can be seen, the plots 98 and 100 for gas and blood are generally complementary in that as the gas volume increases, the blood volume decreases, and vice versa. Blood inlet pressure $P_i$ and blood outlet pressure $P_o$ for the pump device 42 are indicated as shown on the diagram. The outlet pressure $P_o$ can be located anywhere in the indicated range $P_x$, as determined by any selection of the stroke length of the regenerator 94 (FIGURE 3).

FIGURE 5 is a composite graph showing four separate curves 102, 104, 106 and 108 which are plotted on the same abscissa time scale. The curve 102 is a plot of the position variation of the regenerator 94 (FIGURE 3) and is essentially a sine wave. The variation of pressure of the pump or pump device 42 (FIGURE 2) and the pulser or machine 54 (FIGURE 3), when coupled directly together, is indicated by the curve 104. The pressure $P_{ref.}$ on the base line portion of the curve 104 corresponds to the pressure $P_{ref.}$ indicated in the graph of FIGURE 4. Blood output flow rate from the pump device 42 is depicted by the curve 106 and can be observed to include periodic, short duration, pulses of a relatively high flow rate. On the other hand, the blood input flow rate into the pump device 42, as illustrated by the curve 108, can be seen to be periodic, broad duration, pulses of a relatively low and constant flow rate. The circled numerals along the time axis correspond, of course, to similar circled numerals shown in FIGURES 3 and 4, and serve to relate the curves 102, 104, 106 and 108 to those figures.

Figure 6:
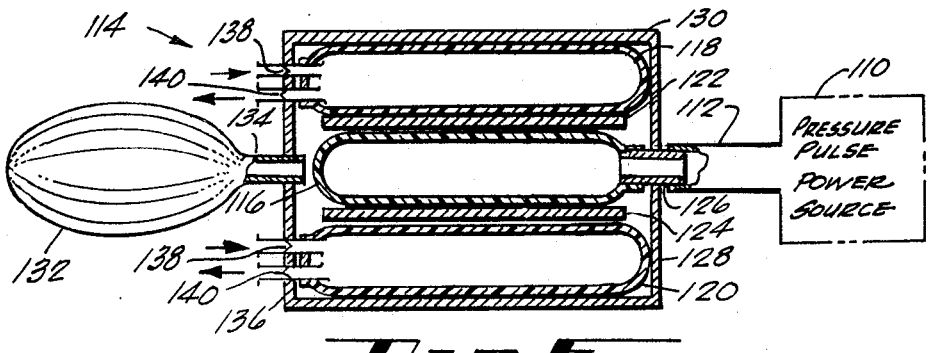
FIGURE 6 is a plan view, shown partially in section and partially diagrammatically, of another version of this invention wherein a single power bladder is used to operate two vessel members.

FIGURE 6 is a plan view, shown partially in section and partially diagrammatically, of another version of our invention. A pressure pulse power source 110 which is, for example, a Stirling cycle machine such as the machine 54 of FIGURE 3, has its output tubing 112 connected to drive pump device 114. The pump device 114 is generally similar to the pump device shown in FIGURE 2 except that the driven power bladder 116 operates two resilient vessels 118 and 120 through respective depressor means 122 and 124. The depressor means 122 and 124 are shown in this instance to be simple flat plates. Of course, other forms of (more complex) mechanical devices for squeezing the vessels 118 and 120 can be utilized in lieu of the flat plates as the depressor means 122 and 124.

A short tubing 126 mounted in the wall 128 of rigid container 130 connects the output tubing 112 to the power bladder 116, and a surge bladder 132 is illustratively shown with its connecting tubing 134 protruding through wall 136 into the rigid container 130. The resilient vessels 118 and 120 are each similar to the resilient vessel 72 of FIGURE 2 except that the inlet and outlet check valves 138 and 140 of each vessel are located on a vessel end opposite to the vessel end that is adjacent to the inlet of the power bladder 116. Thus, each incoming pressure pulse moves into the power bladder 116 in a direction (to the left in FIGURE 6) which is the same as that in which the vessels 118 and 120 are exhausted. The vessels 118 and 120 are also filled in the same direction (to the right in FIGURE 6) as that in which the power bladder 116 is exhausted.

Figure 7:
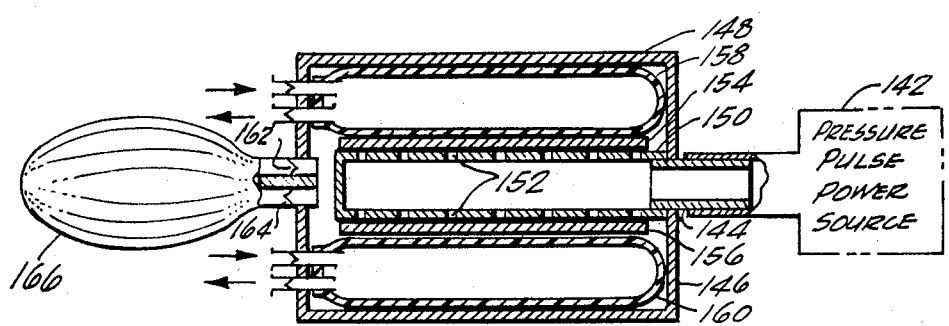
FIGURE 7 is a plan view, shown partially in section and partially diagrammatically, of yet another version of this invention wherein a power bladder is not utilized and preset or predetermined pressure inlet and outlet valves connect the surge bladder to the rigid container.

FIGURE 7 is a plan view, shown partially in section and partially diagrammatically, of yet another version of this invention. It can be easily seen that this version is similar to that of FIGURE 6. The power bladder is, however, omitted and pressure pulse power source 142 is connected by the short tubing 144 mounted in the right wall 146 of the rigid container 148 to a rigid, side perforated, closed end tube 150. The perforations 152 are positioned in the sides of tube 150 to direct the force of a pressure pulse against the depressor means 154 and 156 which respectively operate the resilient vessels 158 and 160.

The pressure inside the rigid container 148 can be maintained substantially constant or within predetermined limits by suitably selected or adjusted spring-loaded inlet and outlet valves 162 and 164. These valves 162 and 164 can connect the container 148 to the atmosphere or to a surge bladder 166 as illustrated in FIGURE 7. Such spring-loaded or biased valves 162 and 164, or a valve which combines both valves into one, can be used on the rigid container of any version of this invention.

Figures 8A, 8B:
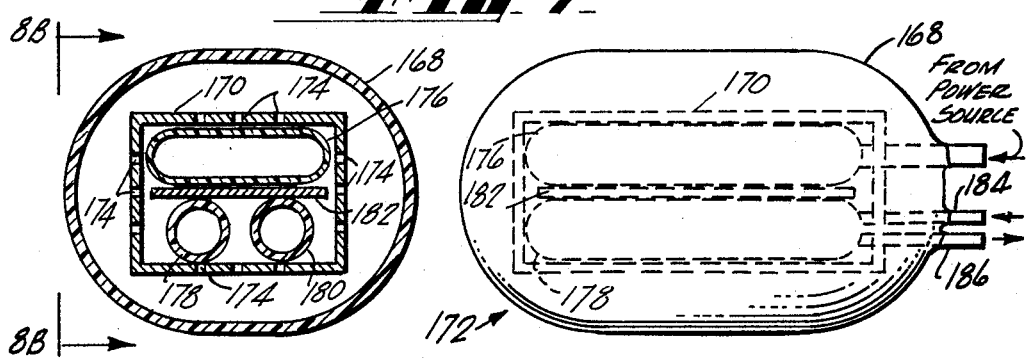
FIGURE 8A is a cross sectional view of a pump device wherein the rigid container thereof is porous, and the surge bladder completely surrounds such rigid container.
FIGURE 8B is a side elevational view, as taken along the line 8B—8B, of the pump device indicated in FIGURE 8A.

FIGURES 8A and 8B illustrate a version of our invention wherein the surge bladder 168 completely surrounds the rigid container 170 to form a unitary pump device 172. The rigid container 170 is porous in this instance, having apertures 174 provided in the walls thereof. The power bladder 176 operates the resilient vessels 178 and 180 through the depressor means 182. Inlet and outlet check valves (not shown) can be suitably placed in the inlet and outlet tubings 184 and 186 of each resilient vessel outside of the surge bladder 168 for convenience and ease of access. The advantage of the pump device 172 is that it is an integral and unitary unit. Its disadvantage is that the entire unit must normally be replaced since internal repairs cannot be easily made.

Figure 9:
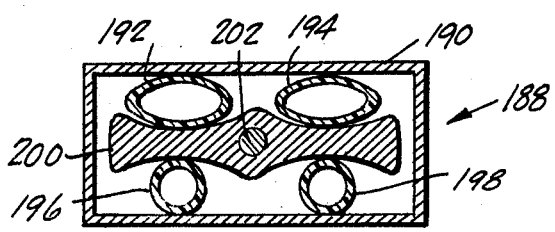
FIGURE 9 is a cross sectional view of a pump device wherein two power bladders are alternately operable to discharge two resilient vessels respectively associated with the power bladders.

FIGURE 9 is a cross sectional view of a pump device 188 wherein the rigid container 190 includes two power bladders 192 and 194 which operate respective resilient vessels 196 and 198 through a centrally pivoted and rotatable depressor means 200. The power bladders 192 and 194 are alternately energized by properly phased power sources (not shown) wherein their pressure pulses are appropriately spaced timewise to operate the power bladders 192 and 194 alternately in sequence Thus, when the power bladder 192 is expanded, the depressor means 200 is pivoted counterclockwise on its pivot shaft 202 to compress the resilient vessel 196 and discharge its contents. The power bladder 194 is expanded next to pivot the depressor means 200 in a clockwise direction to compress the resilient vessel 198 and the power bladder 192 which will be energized again on the next pressure pulse, to repeat the cycle.

The rigid container 190 can be open directly to atmosphere or connected to a surge bladder (not shown). Of course, the rigid container 190 can be fully sealed and connected either to the atmosphere or a surge bladder through suitable spring-loaded inlet and outlet valves as in FIGURE 7, if desired. A power bladder and its corresponding resilient vessel can also be omitted so that only one set is included in the rigid container 190. Further, where the resilient vessels 196 and 198 are of low resiliency, the depressor means 200 can be suitably centered by appropriate centering springs (not shown) connecting the depressor means 200 to the rigid container 190. Other modifications in the pump device 188 can be made as may be required.

We claim:

1. A pulsatile, passive filling, pump device comprising:
    a container including rigid structure therein and normally containing a predetermined amount of retarding fluids.
    at least one power means housed within said container and adapted to be connected to a source of pressure pulses;
    at least one vessel housed within said container and positioned adjacent to said rigid structure and to said power means, said vessel being adapted to be operated against said rigid structure by said power means when it is energized by a pressure pulse and including an inlet check valve and an outlet check valve therein;
    means for connecting a mobile fluid from a supply point to said inlet check valve and filling said vessel, said power means compressively discharging said mobile fluid from said vessel through said outlet check valve when said power means is energized by a pressure pulse;
    means for connecting said outlet check vlave to a receiving point for the discharged mobile fluid; and
    a distensible surge bladder communicating with said container for receiving a portion of said retarding fluid displaced therefrom when said power means is being energized, said retarding fluid portion being returned to said container to retard resumption of said vessel to its normal condition as said power means is being de-energized.

2. The invention as defined in claim 1 wherein said power means is an elongated and resilient power bladder, and said vessel is an elongate and resilient element of approximately the same length as said power bladder, said power bladder and vessel element being positioned longitudinally relative to each other.

3. The invention as defined in claim 1 wherein said power means is a perforated tube adapted to be connected to the source of pressure pulses, and said vessel is an elongate and resilient element of approximately the same length as said perforated tube.

4. The invention as defined in claim 1 wherein said container is porous, and said surge bladder encloses said porous container.

5. The invention as defined in claim 1 wherein said container is a sealed element including means for controlling the pressure therein to predetermined conditions.

6. The invention as defined in claim 5 wherein said pressure controlling means includes inlet and outlet valves adjustable to predetermined pressures and connecting the interior of said container to the interior of said surge bladder.

7. The invention as defined in claim 1 including, in addition, depressor means for applying the output of said power means to said vessel to operate the same.

8. The invention as defined in claim 7 wherein said depressor means is pivotally mounted to said container.

9. The invention as defined in claim 2 wherein one end of said power bladder is connected to said source of pressure pulses, and said inlet and outlet check valves are positioned in one end of said vessel element wherein said vessel element end is generally located at a longitudinally opposite end to said power bladder end, whereby each pressure pulse travels progressively into said power bladder in a direction which is the same as that in which said vessel element is being progressively exhausted simultaneously and said vessel element is progressively filled subsequently in the same direction as that in which said power bladder is simultaneously being progressively exhausted.

References Cited

UNITED STATES PATENTS 2,812,716 11/1957 Gray _____ 103—44 XR
3,045,601 7/1962 Rippingille _____ 103—44

FOREIGN PATENTS 767,524 2/1957 Great Britain.

ROBERT M. WALKER, Primary Examiner

U.S. Cl. X.R.

60—23, 54.5; 103—148